(12) United States Patent
Chang et al.

(10) Patent No.: US 6,583,807 B2
(45) Date of Patent: Jun. 24, 2003

(54) VIDEOCONFERENCE SYSTEM FOR WIRELESS NETWORK MACHINES AND ITS IMPLEMENTATION METHOD

(75) Inventors: Ju-Nan Chang, Taipei (TW); Yung-Fu Wang, Taipei (TW)

(73) Assignee: Invetec Appliances Corp., Taipei (TW)

( * ) Notice: Subject to any disclaimer, the term of this patent is extended or adjusted under 35 U.S.C. 154(b) by 57 days.

(21) Appl. No.: 09/912,399

(22) Filed: Jul. 26, 2001

(65) Prior Publication Data

US 2003/0020806 A1 Jan. 30, 2003

(51) Int. Cl.[7] .................................................. H04N 7/14
(52) U.S. Cl. ................................ 348/14.08; 348/14.09; 709/204
(58) Field of Search ........................... 348/14.01–14.08, 348/14.09, 14.1, 14.11, 14.12, 14.13, 14.16; 370/260; 709/204; 345/753, 755; 455/556, 555; 379/202.01; H04N 7/14

(56) References Cited

U.S. PATENT DOCUMENTS 5,534,914 A * 7/1996 Flohr et al. ............ 379/202.01

FOREIGN PATENT DOCUMENTS

JP    410145765 A   *   5/1998   ............ H04N/7/15

OTHER PUBLICATIONS

Freytes et al.; Real–time H.263+video transmission on 802.11 wireless LANs; IEEE; INSPEC Accession :693590.*

* cited by examiner

Primary Examiner—Melur Ramakrishnaiah
(74) Attorney, Agent, or Firm—Birch, Stewart, Kolasch & Birch, LLP

(57) ABSTRACT

The specification discloses a videoconference system for wireless network machines and its implementation method. Any user can use a wireless network machine to couple to a video capture device, a audio capture device, an image output device and an audio output device. The wireless network machine contains a first AV processing unit, a second AV processing unit, and an audio encoding/decoding unit. Through a WLAN (Wireless Local Area Network), the user can connect to another user using the wireless network machine to perform videoconferencing.

20 Claims, 5 Drawing Sheets

VIDEOCONFERENCE SYSTEM FOR WIRELESS NETWORK MACHINES AND ITS IMPLEMENTATION METHOD

BACKGROUND OF THE INVENTION

1. Field of Invention

The invention relates to a videoconference system and its implementation method and, in particular, to a videoconference system for a wireless network machine and its implementation method.

2. Related Art

Modern communication technologies have made great progress to conquer people's separations by distances. The birth of videoconference systems further enables us to enter a new era of AV effects in conversation. The use of videoconference systems does not only increase the enterprise efficiency, shorten the time for making decisions, but also avoids unnecessary traffic time and increases communication and discussion opportunities. For policy declaration purposes, global education or training, or technology workshops, videoconferencing has been proven to be able to greatly enhance the enterprise efficiency.

In short, a videoconference system is a system 10 in which a user and his other party share the same protocol and communicate digital data, images and audios with each other using compressing and decompressing technologies. This dual directional transmission is achieved through digital network 20 such as an ISDN (Integrated Switched Digital Network), an ATM (Asynchronous Transfer Mode), a PSTN (Public Switched Telephone Network), a T1 line or a satellite (FIG. 1). In this method, images and audios on one side can appear on the TV 30 over the other side. This is the so-called videoconference system.

However, currently available videoconference systems tend to have higher installation costs and they have to be used along with a computer or a TV. On the other hand, since they reply on wired network transmission, the locations of videoconferencing are fixed, which is unsatisfactory.

Therefore, a low-cost wireless videoconference device has become a subject that receives much attention.

SUMMARY OF THE INVENTION

The disclosed videoconference system for wireless network machines includes: a first AV processing unit, which receives an AV signal or coded data, separates the AV signal into a audio signal and a video signal, or separates the coded data into an audio coded signal and a video coded signal, and compresses the video signal or decompresses the video coded signal; an audio encoding/decoding unit, which receives the audio signal or the audio coded signal, and compresses audio signal or decompresses the audio coded signal; a second AV processing unit, which receives the compressed video signal from the first AV processing unit and the compressed audio signal from the audio encoding/decoding unit or the decompressed video coded signal from the first AV processing unit and the decompressed audio coded signal from the audio encoding/decoding unit, outputs the compressed video signal and the compressed audio signal to a WLAN (Wireless Local Area Network), and outputs the decompressed video coded signal and the decompressed audio coded signal to an output device. Through the wireless network machine, the videoconferencing performs inputs on the play end and outputs on the transmission end.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
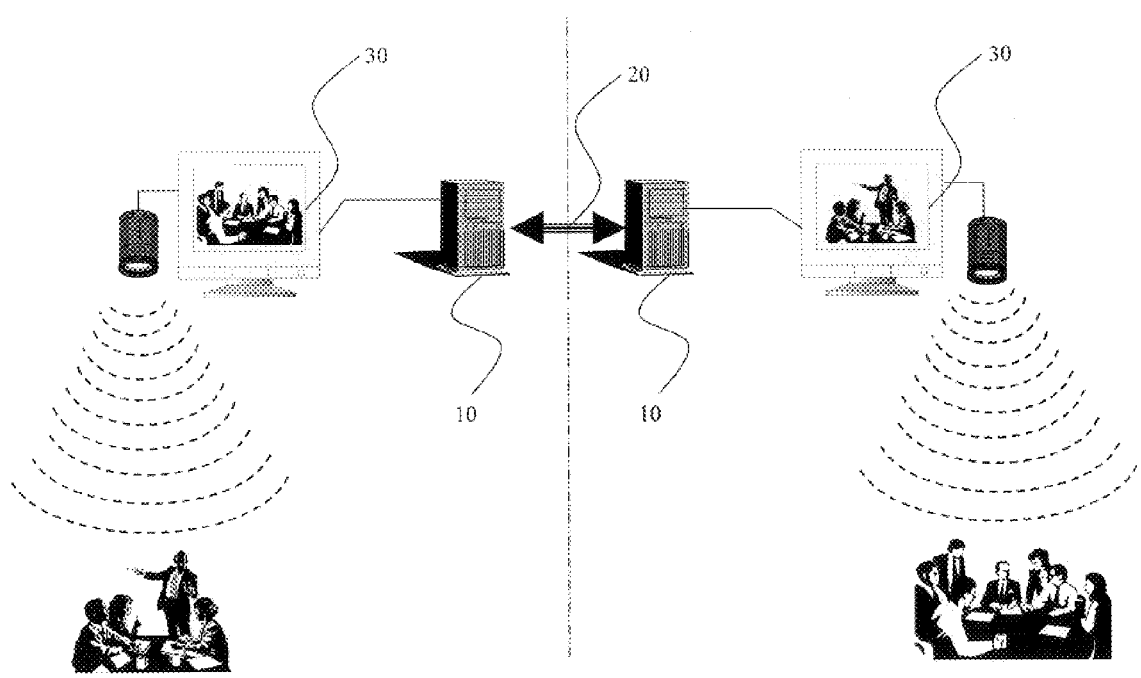
FIG. 1 is the structure of a conventional videoconference system.
Figure 2:
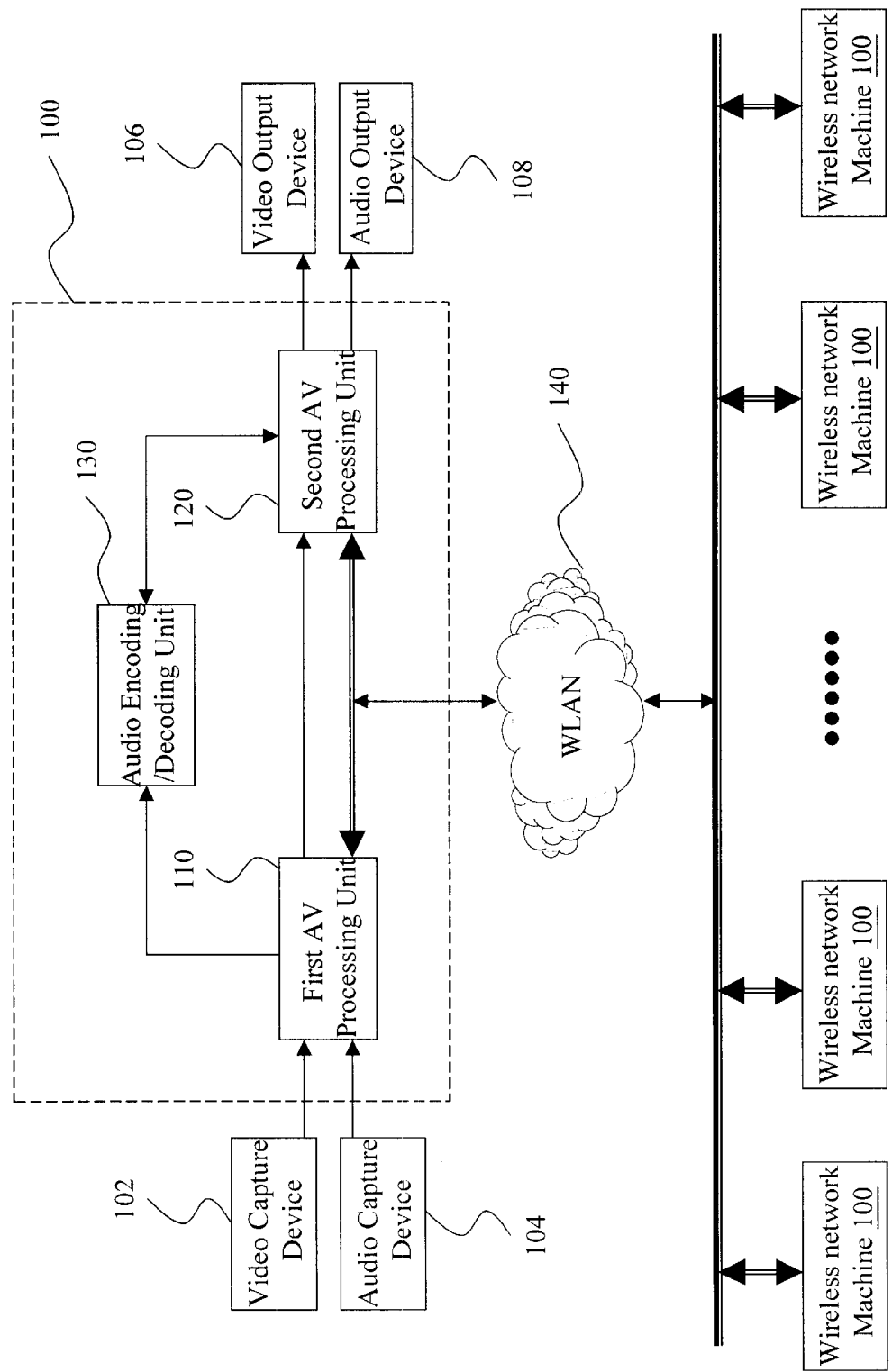
FIG. 2 is the structure of a videoconference system of the invention.

The invention provides a videoconference system for wireless network machines and its implementation method. With reference to FIG. 2, any user can use a wireless network machine 100 to couple a video capture device 102, an audio capture device 104, a video output device 106 and an audio output device 108. The wireless network machine 100 contains a first AV processing unit 110, a second AV processing unit 120 and an audio encoding/decoding unit 130. Through a WLAN (Wireless Local Area Network) 140, another party is connected to the user to have videoconferencing using their wireless network machines 100.

The videoconferencing through the disclosed wireless network machine 100 consists of output signals (video and audio) from the other party and the video and audio signals of the user input through the video capture device 102 and the audio capture device 104. The first AV processing unit 110 separates the video and audio signals to process. To achieve real time AV play effects, the video signals are output to the second AV processing unit 120 for further video signal compression/decompression operations. After the audio signals are output to the audio encoding/decoding unit 130, both the video and audio signals are sent to the second AV processing unit 120 so as to achieve simultaneous and real-time playing and transmission effects.

Figure 3:
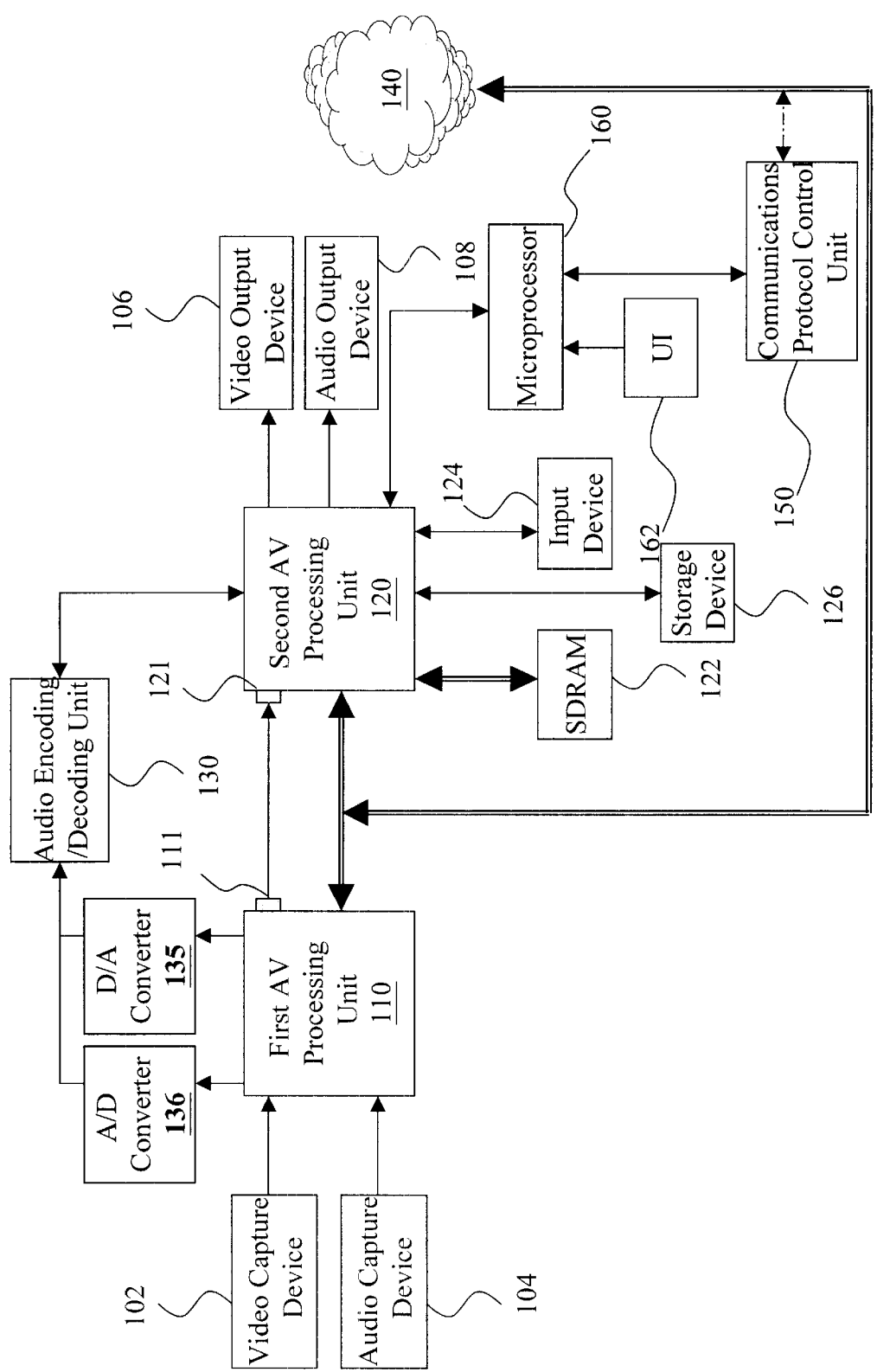
FIG. 3 is the structure of a videoconference system for wireless network machines according to the invention.

Referring to FIG. 3, the first AV processing unit 110 can send or receive 8-bit digital data satisfying the CCIR 601/656 standards. We will use a digital camera which outputs CCIR 656 standard, 8-bit, 4:2:2 YUV data as an example. When the first AV processing unit 110 receives complete AV signals or coded data, the video signal is compressed (encoded) and decompressed (decoded) through a videoconference system coding standard (H.261 or H.263). Through a PCI bus and the second AV processing unit 120, the video signal is stored in an SDRAM (Synchronous Dynamic Random Access Memory) 122. The video output device 106 and the audio output device 108 then play the decompressed AV signals in real time. Or the compressed signals are transmitted to another machine through a WLAN 140.

When the second AV processing unit 120 receives data from the compressed/decompressed video signal stream (H.261 or H.263 protocol), the data are transmitted via a PCI bus. Video frames are extracted from the compressed data by decompressing the video signal stream and are stored in the SDRAM 122. The compressing/decompressing procedure can be completed by a VLD (Variable Length Decoding)

processing unit using the Huffman coding. In addition, the system further provides an input device 124 (such as a keyboard or a mouse) and a storage device 126 (such as a floppy disk drive or a CD-ROM) for storing documents and data needed for videoconferencing.

The implementation method for the videoconferencing using the disclosed wireless network machine 100 can be described in two respects, namely, the playing and transmission of signals on both ends of a WLAN 140.

Figure 4:
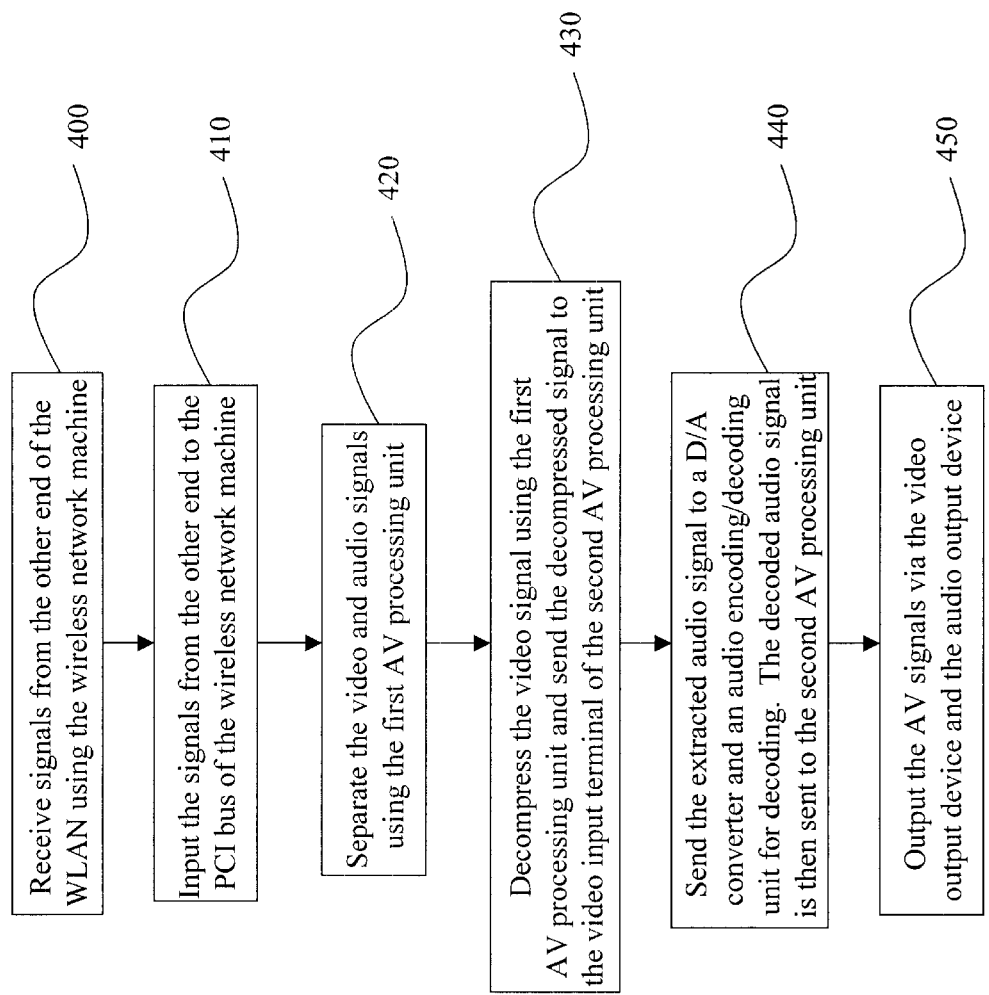
FIG. 4 is a flowchart of the implementation method for videoconferencing on the play end according to the invention.

With reference to FIG. 4, when receiving signals from the other end of the WLAN 140 using the wireless network machine 100 (step 400), the connection is made possible using the communications protocol control unit 150 of the wireless network machine 100. A microprocessor 160 processes the control mode of the signals on both ends. A UI (User Interface) 162 (such as a hot key) is provided to send functional commands to the microprocessor 160. After the connection is established, the signals (video and audio signals) from the other end enter the PCI bus of the wireless network machine 100 (step 410). A first AV processing unit 110 separates the video and audio signals (step 420). After the decompression operation of the first AV processing unit 110, the video signals are transmitted to the video input terminal 121 of a second AV processing unit 120 via a video output terminal 111 (step 430). At the moment, the audio signal extracted from the first AV processing unit 110 is sent to a D/A converter 135 and then decoded by an audio encoding/decoding unit 130. The decoded audio signal is sent to the second AV processing unit 120 (step 440). Through a video output device 105 and an audio output device 108, the signals are played in real time (step 450).

Figure 5:
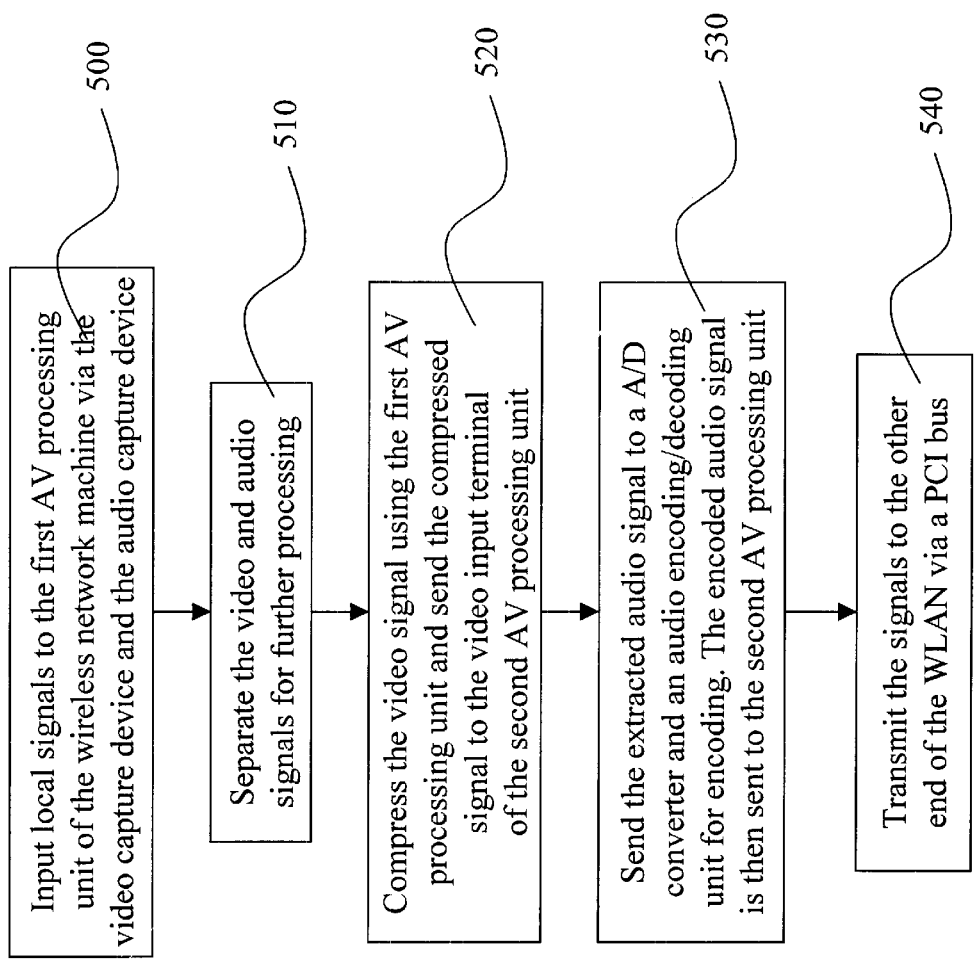
FIG. 5 is a flowchart of the implementation method for videoconferencing on the transmission end according to the invention.

With reference to FIG. 5, when the wireless network machine 100 is transmitting a local signal, a video capture device 102 and an audio capture device 104 input the local AV signals to a first AV processing unit 110 (step 500) to separate the video and audio signals for further processing (step 510). After the compression operation of the first AV processing unit 110, the compressed video signal is transmitted to the video input terminal 121 of the second AV processing unit via a video output terminal 111 (step 520). At the moment, the extracted audio signal from the first AV processing unit 110 is sent to an A/D converter 136 and encoded by an audio encoding/decoding unit 130. The encoded audio signal is sent to the second AV processing unit 120 (step 530). Finally, the signals are sent to the other end of the WLAN 140 via a PCI bus (step 540).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A videoconference system for a wireless network machine, which comprises:
    a first AV (Audio/Video) processing unit, which receives AV signals/encoded data, separates the AV signals into an audio signal and a video signal/separates the encoded data into an audio encoded signal and a video encoded signal, and compresses the video signal/decompresses the video encoded signal;
    an audio encoding/decoding unit, which receives the audio signal/the audio encoded signal and compresses the audio signal/decompresses the audio encoded signal; and
    a second AV processing unit, which receives the compressed video signal from the first AV processing unit and the compressed audio signal from the audio encoding/decoding unit/the decompressed video encoded signal from the first AV processing unit and the decompressed audio encoded signal from the audio encoding/decoding unit, and outputs the compressed video and audio signals to a WLAN (Wireless Local Area Network)/outputs the decompressed encoded video and audio signals to an output device;
    wherein videoconferencing is performed by inputting signals at a playing terminal and outputting signals at a transmission terminal using the wireless network machine.

2. The system of claim 1, wherein the AV signals are provided by a local video capture device and a local audio capture device.

3. The system of claim 1, wherein the encoded data are provided from the other end of the WLAN.

4. The system of claim 1, wherein the audio signal is converted into a digital audio signal by an A/D (Analog/Digital) converter.

5. The system of claim 1, wherein the audio encoded signal is converted into an analog audio signal by a D/A (Digital/Analogue) converter.

6. The system of claim 1, wherein the output device includes a video output device and an audio output device.

7. The system of claim 1 further comprising a communications protocol control unit to connect to the WLAN.

8. The system of claim 1 further comprising a microprocessor for processing the control mode of the signals on both ends of the WLAN.

9. The system of claim 8, wherein the microprocessor further couples to a UI (User Interface) for a user to send functional commands to the microprocessor.

10. The system of claim 1, wherein the second AV processing unit further couples to an output device and a storage device for document and data storage needed in the videoconference.

11. A method for inputting signals at the playing terminal of a wireless network machine in videoconferencing, which comprises the steps of:
    receiving compressed signals from the other end of a WLAN using the wireless network machine;
    inputting the compressed signals from the other end to the PCI bus of the wireless network machine;
    separating the compressed signals into a video compressed signal and an audio compressed signal using a first AV processing unit;
    decompressing the compressed video signal using the first AV processing unit and sending the decompressed video signal to a video input terminal of a second AV processing unit via a video output terminal;
    decoding the extracted audio compressed signal using an audio encoding/decoding unit, converting the signal into an analog signal using a D/A (Digital/Analog) converter, and outputting the resulting signal to the second AV processing unit; and
    outputting the video signal and the audio signal via a video output device and an audio output device.

12. The method of claim 11 further comprising a communications protocol control unit to connect to the WLAN.

13. The method of claim 11 further comprising a microprocessor to process the control mode of the signals on both ends of the WLAN.

14. The method of claim 13, wherein the microprocessor further couples to a UI that sends functional commands to the microprocessor.

15. The method of claim 11, wherein the second AV processing unit further couples to an output device and a storage device for storing documents and data needed for the videoconference.

16. A method for outputting signals at a transmission terminal of a wireless network machine in videoconferencing, which comprises the steps of:

inputting local AV signals to a first AV processing unit of the wireless network machine via a video capture device and an audio capture device;

separating the AV signals into a video signal and an audio signal;

compressing the video signal using the first AV processing unit and sending the compressed video signal to a video input terminal of a second AV processing unit via a video output terminal;

converting the audio signal into a digital audio signal using an A/D (Audio/Video) converter, encoding the digital audio signal using an audio encoding/decoding unit, and outputting the encoded audio signal to the second AV processing unit; and transmitting the encoded video and audio signals to the other end of the WLAN via a PCI bus of the wireless network machine.

17. The method of claim 16 further comprising a communications protocol control unit to connect to the WLAN.

18. The method of claim 16 further comprising a microprocessor to process the control mode of the signals on both ends of the WLAN.

19. The method of claim 18, wherein the microprocessor further couples to a UI that sends functional commands to the microprocessor.

20. The method of claim 16, wherein the second AV processing unit further couples to an output device and a storage device for storing documents and data needed for the videoconference.

* * * * *